United States Patent Office 3,824,210
Patented July 16, 1974

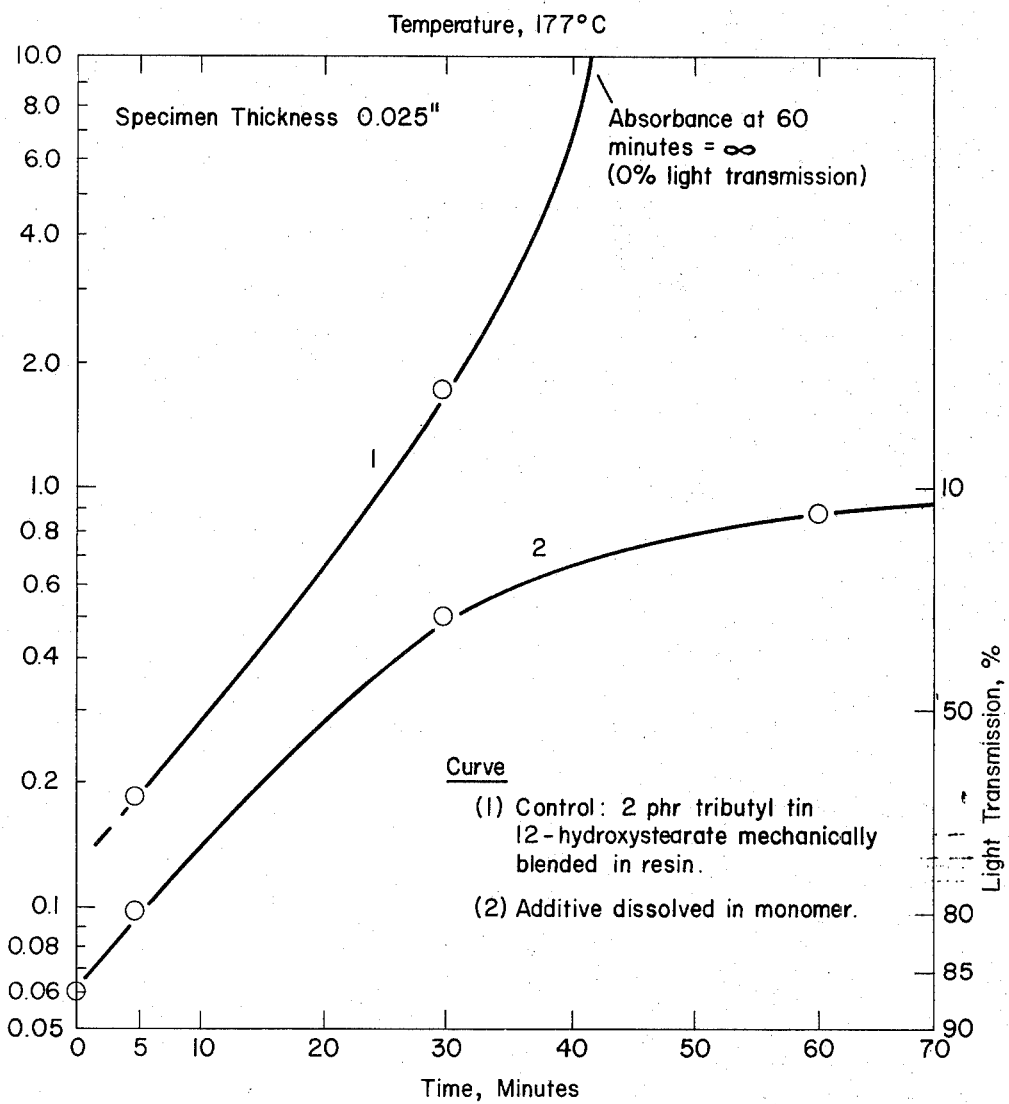

3,824,210
ORGANOTIN SALTS OF HYDROXY-SUBSTITUTED ALKANOIC ACIDS: STABILIZERS FOR POLYVINYL CHLORIDE
Laurence F. King, Mooretown, Ontario, Canada, assignor to Esso Research and Engineering Company
Filed Jan. 12, 1972, Ser. No. 217,268
Int. Cl. C08f 45/62
U.S. Cl. 260—45.75 K                 7 Claims

ABSTRACT OF THE DISCLOSURE

An improved polyvinyl chloride and a process for preparing said polymer which comprises including in the reactant mixture a stabilizer lubricant comprising an alkyl tin hydroxystearate.

BACKGROUND OF THE INVENTION

In the processing of rigid polyvinyl chloride it is essential that lubricants and stabilizers be incorporated into the compounded compositions. Stabilizers are necessary to prevent the degradation of the polymer at the processing temperatures, e.g. 350°–450° F. External lubricants serve to lubricate the PVC against the metallic surfaces in processing. Internal lubricants reduce intermolecular friction within the polymeric mass by plasticization of polymer segments. They have an affinity for or compatibility with the polymer. For rigid PVC, which is the most difficult of all plastics to lubricate, both external and internal lubricants as required; only rarely can both properties be combined in one chemical compound. Almost invariably mixtures are used. Stabilizers for polyvinyl chloride are well known. Similarly (external) lubricants are well known and the general characteristics of lubricants have been defined as compounds having relatively low solubility in polyvinyl chloride, high polarity and an optimum viscosity at processing temperatures. Hence the lubricant itself, although often a solid and relatively incompatible with the polyvinyl chloride, must be fluid at processing temperatures and at the same time have sufficient polarity so as to maintain certain residual cohesion between the lubricant and polyvinyl chloride in the product. At the same time, there must be a certain affinity between the lubricant and the steel of the processing equipment.

The problems of stabilization and lubrication are particularly severe with rigid transparent polyvinyl chloride is to be processed, as for example in the preparation of transparent bottles of PVC. Modes of operation are available for producing such products which comprise the sequence of (1) blending, (2) continuous mixing, (3) extrusion, (4) pelletization and (5) extrusion-blow molding. An operational sequence of this complexity places great demands on lubricants and stabilizers, and its success depends, above all, on the primary blending step. If a uniform dispersion is not obtained in the powder blend, processing difficulty ensues in one or more of the subsequent processing steps.

In small batch blending, e.g. 500–1500 lbs., where high speed mixers such as Henschel-type blenders may be used, dispersions are uniform resulting in products of excellent quality. See, for example, copending U.S. Application Ser. No. 94,832, now U.S. Pat. 3,666,700.

Unfortunately, full-size commercial operations presently use ribbon-type blenders of low speed, e.g. 20–30 r.p.m., which provide essentially only tumbling action and relatively poor mixing or dispersion.

Ideally, the stabilizers and lubricants should be added in the polymerization step, thereby insuring uniform dispersion throughout the polymer form. However, many different lubricants and stabilizers interfere with the polymerization reaction. Various compounds, however, have been added during the polymerization step successfully.

Metallic or insoluble soaps have been used as the sole emulsifiers in the emulsion polymerization of polyvinyl chloride. See, for example, U.S. Pats. 3,167,533 and 3,189,587. Especially useful soaps have included the metal salts of various fatty acids. In particular, salts of barium, calcium, cadmium, zinc and like salts of fatty acids such as stearic and oleic acids. Chlorine-containing polymers have been stabilized by copolymerizing with vinyl chloride a metal salt or ester of an ethylenically unsaturated aliphatic acid. Suitable metals are cadmium, tin, barium and zinc and suitable acids are acids of the acrylic acid series, tributyl tin esters of acrylic or other beta-ethylenic unsaturated carboxylic acids. See, for example, U.S. Pat. 3,069,400. Polyvinyl chloride has been polymerized in aqueous suspensions in the presence of bivalent metal salts of alkyl-β-imino dipropionic acids, the preferred metals being barium, calcium, tin and zinc in which the alkyl groups contain about 8–16 carbons. See, for example, U.S. Pat. 2,996,490. Cadmium salts of 12-hydroxystearic acid have been used as stabilizers for polyvinyl chloride by dry blending of the salt with the polymer. See, for example, U.S. Pat. 3,127,366.

SUMMARY OF THE INVENTION

It has surprisingly been found that polyvinyl chloride may be polymerized in the presence of an alkyl tin hydroxy stearate without affecting the polymerization rate or conversion. Furthermore, the particle size of the resin is unaffected. The clarity of products prepared in this manner is excellent and the additive in addition to stabilizing the polyvinyl chloride acts as a lubricant for the polymer.

DETAILED DESCRIPTION

This invention relates to a process for preparing polyvinyl chloride polymers. In particular, this invention relates to an improved process which results in a polyvinyl chloride composition which has been stabilized and has included therein a lubricant. Emulsion polymerization and suspension polymerization methods for preparing polyvinyl chloride polymers are well known in the art. Generally, the monomer is dispersed in a water phase and polymerization initiated by free radical catalysis.

Where additives are included in the polymerization reaction mixture, they must be such that they do not interfere with the polymerization or otherwise affect the quality of the product. Parameters which are important in this regard are the polymerization rate, the particle size, and the color/clarity of the product. Additionally, the particle size distribution of the product is important and for suspension polymers must be in the range of about 80 to about 200 mesh. Outside of this range difficulties are encountered in blending or otherwise processing the resultant product. Hence, any modification of the process must be such that it has no deleterious effects on these critical parameters. The term "polyvinyl chloride" as used in this invention is meant to include both homopolymers of vinyl chloride and co- and terpolymers of vinyl chloride with comonomers such as vinyl acetate, vinyl formate, alkyl vinyl ethers, ethylene, propylene, butylene, vinylidene chloride, alkyl acrylates and methacrylates, alkyl maleates, alkyl fumarates, etc. Preferably at least 80% and more preferably 100% of the monomer to be polymerized will be a vinyl chloride monomer. The polymers have a weight average molecular weight of about 40,000 to about 90,000, preferably about 55,000 to about 80,000. Inherent viscosity as measured by ASTM D1243–60 Method A will generally be in the range of about 0.5 to about 1.0, preferably in the range of about 0.6 to about 0.9. The method of preparation of polymers either by suspension polymerization or emulsion polymerization is well known and is not critical to the invention. Generally however, the heat stability requirements of emulsion polymerized resins are not so severe as to require the improved stabilization provided by the instant invention.

Methods of preparing polyvinyl chloride (PVC) resins are well known in the art; see for example, U.S. Pat. 3,468,859 incorporated herein by reference. In general a dispersing agent, e.g. polyethylene oxide, is dispersed in water and a peroxide added to the system. Vinyl chloride is then fed into the reactor at a temperature above the decomposition temperature of the peroxide. The resulting polymer precipitates from the water solution but remains suspended therein.

In carrying out the polymerization, it is essential that any modifications of the polymerization do not adversely alter particle properties. In carrying out a suspension polymerization, it is desirable that the particle size of the resultant polymer be about 80 to 200 mesh (ASTM), more preferably about 100 to 150.

Other properties of the polymer include clarity and yellowness index. Since yellowness of the polymer will affect its clarity, it is desirable to have a product which is as low in yellowness as possible. Ideally, 100% clarity is desired but a clarity of 75% may be tolerated. Similarly, although a yellowness index of 100% is preferred, a yellowness index of 50% is tolerable. These percentage numbers are relative and refer to a percent of the ideal case. A yellowness index of less than 0 is considered 100%, while a yellowness index of about 0–2 is 75% and a yellowness index of 2–5 is 50%. Ordinarily when stabilizer and lubricant are added conventionally by compounding, the yellowness index will vary between 2 and 10.

The preferred additive will result in the production of PVC which after milling for one minute to five minutes has a yellowness index (YI) of less than 5, a clarity ($Y_{CIE}$) of greater than 71, shows good lubricity in lubricity tests and has a particle size distribution within the acceptable range, e.g. 80–200 mesh. Additionally the polymerization rate should not be reduced by more than 10%/hr.

Yellowness index as used herein is determined according to the standard procedure designated as ASTM D1925–63T. The formula applied is as follows:

$$Y.I. = \frac{100(1.28 X_{CIE} - 1.06 Z_{CIE})}{Y_{CIE}}$$

The terms $X_{CIE}$, $Y_{CIE}$ and $Z_{CIE}$ are tristimulus values wherein X=red, Y=green or brightness, and Z=blue. The CIE system is an internationally recognized classification system for establishing and reproducing the visual impression given by a color. Methods for calculating and determining the X, Y and Z values are well known in the art; see for example, "The Handbook of Colorimetry," Hardy, A. C.; MIT Press, Cambridge (1936), incorporated herein by reference.

The clarity of the polymer is a function of light transmission or light absorption.

Samples are evaluated in a spectrophotometer for light transmittance or absorbance, and in a colorimeter to determine the tristimulus values. $Y_{CIE}$ is the clarity value.

The lubricity of the polymer composition was not measured per se; however, an estimate of the lubricity was obtained by examining the effect of dynamic mill tests on the polymer. During milling or other mechanical processing of unstabilized polymer, there is a degradation of the polymer which affects its light transmission or absorbance. Additionally, in milling the unstable unlubricated materials or inadequately lubricated materials will stick to the rolls after a period of milling. It has surprisingly been found that the polymers prepared in the manner taught by the applicants have a lower glass transition temperature than homopolymers prepared by conventional means. This lower glass transition temperature results in a more processable polymer which has the general characteristics of the more readily processable copolymers of polyvinyl chloride.

The stabilizer lubricants of this invention which may be added during the polymerization step have the general formula: $R_n SnR'_{4-n}$ wherein R is alkyl, R' is a saturated hydroxy $C_{12}$–$C_{24}$ acid moiety and $n$ is 2 or 3. The preferred acid moiety is stearic acid. Hence, the polymers are preferably mono- or dihydroxystearic acid derivatives of an alkyl tin. Preferably, the alkyl group is a $C_2$ to $C_8$ alkyl; more preferably at $C_3$ to $C_5$ alkyl goup, e.g. butyl. Illustrative examples of the alkyl groups are ethyl, methyl, propyl, butyl, pentyl, hexyl, cyclohexyl, octyl, etc. The hydroxystearate radical, for example, may be derived from the monohydroxy stearic acid, e.g. 12-hydroxystearic acid, or the dihydroxystearic acid, e.g. 9,10-hydroxystearic acid. The stabilizer-lubricant composition of this invention is prepared by adding a salt of the hydroxystearic acid to a solution of the alkyl tin halide. Table I shows various compositions which were used for the preparation of stabilizers and the stabilizer structure. The R of the chemical structure is the alkyl group associated with the alkyl tin chloride and the R' of the formula above is the organic acid derived moiety of the salt. Other organic acids from which R' may be derived are: $C_{12}$, α hydroxy lauric acid, β hydroxy undecane β carboxylic acid, sabinic acid; $C_{13}$, α hydroxy dodecane α carboxylic acid, $C_{14}$, α hydroxy myristic acid, $C_{15}$, α hydroxy tetradecane α carboxylic acid, $C_{16}$, α hydroxy palmitic acid, juniperic acid, $C_{20}$, α hydroxy arachidic acid, and $C_{22}$, α hydroxy behenic acid, 13 hydroxy behenic acid.

TABLE I.—STABILIZER-LUBRICANT ADDITIVES

| Number | Reactant A | Reactant B | Mole ratio, A:B | Chemical structure |
|---|---|---|---|---|
| I | Dibutyl tin dichloride | 12-hydroxy stearic acid (K salt) | 1:2 | $[CH_3-(CH_2)_4-\underset{OH}{CH}-(CH_2)_{11}-COO]_2 SnR_2$ |
| II | do | 9,10-dihydroxy stearic acid (K salt) | 1:2 | $[CH_3-(CH_2)_6-\underset{OH}{CH}-\underset{OH}{CH}-(CH_2)_8-COO]_2 SnR_2$ |
| III | Tributyl tin chloride | 12-hydroxy stearic acid (K salt) | 1:1 | $CH_3-(CH_2)_4-\underset{OH}{CH}-(CH_2)_{11}-COOSnR_3$ |
| IV | do | Methyl 12-hydroxy stearate (Na deriv.) | 1:1 | $CH_3-(CH_2)_4-\underset{OSnR_3}{CH}-(CH_2)_{11}-COOCH_3$ |
| V | do | 9,10-dihydroxy stearic acid (K salt) | 1:1 | $CH_3-(CH_2)_6-\underset{OH}{CH}-\underset{OH}{CH}-(CH_2)_8-COOSnR_3$ |
| VI | do | Methyl 9,10-dihydroxy stearate (mono-Na deriv.) | 1:1 | $CH_3-(CH_2)_4-\underset{OSnR_3}{CH}-\underset{OH}{CH}-(CH_2)_8-COOCH_3$ |
| VII | do | Stearic acid (K salt) | 1:1 | $CH_3-(CH_2)_{11}-COOSnR_3$ |

TABLE I.—STABILIZER-LUBRICANT ADDITIVES

| Number | Reactant A | Reactant B | Mole ratio, A:B | Chemical structure |
|---|---|---|---|---|
| VIII | do | Oleic acid (K salt) | 1:1 | $CH_3-(CH_2)_7-CH=CH-(CH_2)_7-COOSnR_3$ |
| IX | do | Ricinoleic acid (K salt) | 1:1 | $CH_3-(CH_2)_5-\underset{\underset{OH}{\|}}{CH}-CH_2-CH=CH-(CH_2)_7COOSnR$ |
| X | do | Cetyl alcohol (Na deriv.) | 1:1 | $CH_3-(CH_2)_{14}-CH_2-O-SnR_3$ |
| XI-A | do | p-Dodecyl phenol (K salt) | 1:1 | $C_{12}H_{25}-\langle\text{phenyl}\rangle-OSnR_3$ |
| XI-B | do | p-Dodecyl phenol (Na deriv.) | 1:1 | |
| XII | do | 1-dodecyl mercaptan (Na deriv.) | 1:1 | $CH_3-(CH_2)_{10}-CH_2-S-SnR_3$ |
| XIII | do | Octadecyl β-amine | 1:1 | $CH_3-(CH_2)_{15}-\underset{\underset{CH_3}{\|}}{CH}-\underset{\underset{SnR_3}{\|}}{NH_2^+Cl^-}$ |
| XIV | do | Sebacic acid (mono-K salt) | 1:1 | $HOOC-(CH_2)_8-COOSnR_3$ |
| XV | do | Sebacic acid (di-K salt) | 2:1 | $R_3SnOOC-(CH_2)_8-COOSnR_3$ |

TABLE IA.—CONVENTIONAL STABILIZERS

| M | Dioctyl tin maleate | structure: $\begin{array}{c}HC-C(=O)-O\\ \|\\ HC-C(=O)-O\end{array}Sn(C_8H_{17})_2$ |
|---|---|---|
| N | Dioctyl tin SS'-bis(iso-octyl mercapto acetate) | $C_8H_{17}-Sn(S-CH_2COOC_8H_{17}\text{ (iso)})_2$ with two $C_8H_{17}$ / $S-CH_2COOC_8H_{17}$ (iso) groups |
| O | Thio-organotin, MW 800, 16.5% Sn* | $R_2Sn(SR')_2$ |
| P | Thio-organotin, MW 515, 23% Sn* | $R_2Sn(SR')_2$ |

*Exact composition not known.

The advantages of the instant invention may be more readily appreciated by reference to the following examples:

Example 1

Suspension polymerization was carried out using the compositions set forth in Table II. The control experiment was a typical polymerization of polyvinyl chloride by the suspension method. The products of this invention were compared with the control studies. Product properties are set forth in Table III.

TABLE II.—SUSPENSION POLYMERIZATION OF VINYL CHLORIDE
[3-litre reactor]

| | Control | Experimental |
|---|---|---|
| Vinyl chloride, parts/wt | 100 | 100 |
| Water | 200 | 200 |
| Suspending agent [1] | 0.25 | 0.25 |
| Initiator (caprylyl peroxide) | 0.15 | 0.15 |
| Additive (table I) | nil | 3.0 |
| Methanol | 1.0 | 1.0 |
| Temperature, °C | 62 | |
| Pressure, p.s.i.g. (initial) | 150±5 | |
| Pressure, p.s.i.g. (final) | 70 | [2] |
| Polymerization time, hour | 6 | [2] |
| Conversion, percent (C) | 82 | [3] |
| Polymerization rate, percent C/hr | 13.5 | [3] |

[1] Polyvinyl acetate hydrolyzed 80% to polyvinyl alcohol.
[2] Variable.
[3] Variable, see table III.

TABLE III.—EFFECT OF ADDITIVES ON SUSPENSION POLYMERIZATION OF VINYL CHLORIDE
[Operating conditions: Table II [1]]

| Stabilizer-lubricant (table I): | Sn in polymer (percent) | Polymerization rate (0.15 pts. initiator) (percent/hr.) | Conversion [2] (percent) | Resin particle [3] size |
|---|---|---|---|---|
| Nil | Nil | 13.5 | 82 | Fine. |
| III (3 pts./wt.) | 0.42 | 15 | 90 | Do. |
| IIIA (3 pts./wt.) | 0.29 | 13.5 | 88 | Do. |
| V (3 pts./wt.) | 0.32 | 12 | 91 | Do. |
| VII (3 pts./wt.) | 0.44 | 10 | 87 | Do. |
| I (3 pts./wt.) | 0.26 | 10 | 87 | Do. |
| II (3 pts./wt.) | 0.40 | 10 | 85 | Do. |
| VI (3 pts./wt.) | 0.24 | 10 | 79 | Some coarse. |
| X (3 pts./wt.) | 0.20 | 5 | 42 | Do. |
| XII (3 pts./wt.) | 0.28 | 3 | 55 | Do. |
| XI-B (3 pts./wt.) | 0.20 | 2 | 35 | Fine. |
| XI-A (3 pts./wt) | 0.32 | 1.5 | 25 | Do. |
| IV (3 pts./wt.) | 0.41 | 2 | 38 | Do. |
| IX (3 pts./wt.) | 0.12 | 1 | 17 | Mostly coarse. |
| VIII (3 pts./wt.) | | ≈0 | [5] | |
| XIV (1.5 pts./wt.) [4] | 0.22 | 15 | 90 | Fine. |
| XV (1.5 pts./wt.) | 0.27 | 13.5 | 86 | Do. |
| Stabilizer (table IA): | | | | |
| M (1 pt./wt.) | 0.26 | 12 | 80 | Very coarse. |
| N (1 pt./wt.) | | 0 | [5] | |
| O (1 pt./wt.) | | 0 | 0 | |
| P (1 pt./wt.) | | 0 | 0 | |

[1] Initial pressure 145–155 p.s.i.g.
[2] Based on resin within acceptable particle size range only.
[3] Very coarse >40 mesh; coarse 40 to 80 mesh; fine=at least 95% particles between 80–200 mesh.
[4] Additive formed in situ by reaction of 1.6 pts. tributyl tin chloride and 1.65 pts. potassium 12—OH stearate in monomer. 48% yield, based on Sn found in polymer.
[5] Trace.

The stabilizer lubricant shown in Table III is identified by the same identification number it is given in Table I. For example, stabilizing lubricant No. III of Table III is the product prepared by reaction of tributyl tin chloride with a potassium salt of 12-hydroxystearic acid to give the resulting tributyl tin 12-hydroxystearate as shown in Table I and designated III.

Example 2

Polymer was prepared by suspension polymerization by prior art methods and by the improved method of this invention. For the purpose of this experiment, the stabilizer-lubricant added during the polymerization step was tributyl tin 12-hydroxy-stearate. The formulations were as shown in Table IV. Mill stability tests were performed on samples. These tests comprised milling 100 grams of compound at 350° F. and pressing samples which were evaluated for clarity ($Y_{CIE}$) and color (yellowness index) after varying periods of time of operation. Additionally the time required to produce sticking to the rolls was also evaluated.

TABLE IV.—EFFECT OF PRESTABILIZATION ON DYNAMIC MILL STABILITY AT 177° C.

| | Controls | | Experimental |
|---|---|---|---|
| | A | B | |
| Tributyl tin 12-hydroxy stearate,[1] pts./wt | | | 1.0 |
| Thio-organotin stabilizer,[2] pts./wt | 3.0 | 3.0 | 2.1 |
| Total Sn content, percent | 0.5 | 0.5 | 0.5 |
| Lubricant: | | | |
| Stearic acid (blended) | 1.0 | | |
| 12-hydroxy stearic acid (blended) | | 1.0 | 0.3 |
| Added during polymerization | | | 0.7 |
| Mill stability at 350° F., specimens pressed to 0.02" thickness. | | | |
| Initial light transmission, percent | 85 | 85 | 90 |
| Initial absorbance | 0.065 | 0.065 | 0.045 |
| Time to 0.1 absorbance, minutes | 57 | 75 | 100 |
| Time to 1.0 absorbance, minutes | 135 | 190 | 190 |
| Time to stick to rolls, minutes | 143 | 190 | 210+ |

[1] 16% Sn, added during polymerization.
[2] 16.5% Sn, mechanically blended with finished polymer.

It is evident that not only is the initial light transmission of the product of this invention greater than prior art blended compositions, but the material is more stable upon milling as indicated by the longer life of the product. For example, the time to 0.1 absorbance is respectively 57 and 75 minutes for prior art compositions, whereas it is 100 minutes for the composition of this invention.

Example 3

The polymers prepared by the method of Example 1 using the additives shown in Tables I and IA were tested for lubricity, clarity and yellowness. In addition, the particle size range of the polymers prepared was measured.

The following formulation was used for lubricity, clarity and yellowness tendency tests:

| | |
|---|---|
| Resin, pts./wt. | 100 |
| Methacrylate-butadiene-styrene impact modifier | 12 |
| Stabilizer-lubricant | (*) |
| Organophosphite chelator | 1.5 |
| Polymethyl methacrylate "processing aid" | 3 |
| Microcrystalline wax (160° F. m.p.) | 1.0 |
| White oil (Marcol 52) | 0.5 |
| Violet toner | 0.025 |

*Amount added is adjusted to give constant 0.5% Sn in compound.

Lubricity was tested using a 3" single stand roll mill. The results are shown in Table V.

TABLE V.—EFFECT OF ADDITIVES ON LUBRICATION

| Mill Test at 400° F.— Additive, 3 pts. in resin: | Lubrication Rating (at 5 minutes) |
|---|---|
| None | 2–4 (fair to poor)[1]. |
| I, Table I | 0 (best). |
| II, Table I | 0. |
| III, Table I | 0. |
| V, Table I | 0. |
| VI, Table I | 0. |
| X, Table I | 0. |
| VI-B, Table I | 0. |
| XII, Table I | 0. |
| XIII, Table I | 0. |
| Dioctyl tin maleate (M, Table I–A). | 3 (poor). |
| VII, Table I | 3 (poor). |
| IV, Table I | 4 (worst). |
| XI-A, Table I | 4 (worst). |
| XIV, Table I | 3 (poor). |
| XV, Table I | 4 (worst). |

[1] Correlates with extrusion-blow molding.

The mill samples were tested for clarity ($Y_{CIE}$). These results are shown in Table VI.

TABLE VI.—EFFECT OF ADDITIVES ON CLARITY

| Mill test at 400° F.— Additive, 3 pts. in resin: | Clarity $Y_{CIE}$[1] Avg. for 5-minute interval |
|---|---|
| None | 68–72 |
| XI-B, Table I | 72.2 |
| II | 72.6 |
| III | 72.2 |
| VII | 71.7 |
| I and VI | 71.6 |
| IV | 71.3 |
| X | 71.1 |
| V | 70.5 |
| XII | 69.5 |
| XI-A | 68.6 |
| XIV | 72.6 |
| XV | 69.2 |
| XIII | (2) |

[1] Correlates with $Y_{CIE}$ of bottle sections pressed to same thickness.
[2] Completely degraded.

Yellowness tendency was measured on the mill samples. The results are shown in Table VII.

TABLE VII.—EFFECT OF ADDITIVES ON YELLOWING TENDENCY

| Mill test at 400° F., additive, 3 parts in resin | Initial yellowness index (YI at 1 minute) | Yellowing rate (average), d(Y.I.) dt at 3 min. |
|---|---|---|
| None | 2–6 | 0.5–1.5 |
| XI-B | 3 | 0.6 |
| VI | 1.5 | 0.8 |
| I and X | –0.5 | 1.2 |
| II | 0.5 | 1.6 |
| IV | 5 | 1.8 |
| III | –1 | 2.4 |
| XI-A | 6 | 2.5 |
| V | 1 | 1.8 |
| VII | –4 | 5.6 |
| XII | 13 | 6.0 |
| XIV | 1.5 | 0.7 |
| XV | 2 | 2.2 |
| XIII | ∞ | |

Example 4

Polymer was prepared by the suspension polymerization method of Example 1. A control sample of material was prepared without the addition of the lubricant-stabilizer of this invention. A second batch of material was polymerized wherein the tributyl tin 12-hydroxystearate was dissolved in the monomer during polymerization. The Figure represents the absorbance of the specimen in an oven heat stability test as a function of time for both the control wherein 2 parts per 100 of tributyl tin 12-hydroxystearate was mechanically blended into the resin after polymerization and the results on this product were compared with a polymer prepared wherein 2 parts per 100 tributyl tin 12-hydroxystearate was added during polymerization. It is apparent from the drawing that the absorbance of product prepared by the manner of this invention is far superior to those prepared by prior art techniques. It will be noted that prior art compositions prepared by blending stabilizer-lubricants into the polymer reach an absorbance of about 10 at around 40 minutes, whereas after 70 minutes the product of this invention has an absorbance of about 0.9 and approaches an asymptote of about 1.0.

A review of the data shows that the only tin compounds which meet all the requirements of acceptable polymerization rate, lubricity, clarity, yellowness index and particle size are compositions I, II and III of Table I. All of these compositions are saturated hydroxy acid salts. Hence, the tin compounds of this invention are alkyl tin saturated hydroxy acid salts.

The tin salt should be incorporated into the reaction medium at about 0.5 to about 5 parts by weight per 100 parts of vinyl chloride; preferably about 1.5 to about 3.5 parts by weight, e.g. 3.0 parts by weight per 100 parts of vinyl chloride. Amounts in excess of 5 parts by weight create processing problems due to excessive lubricity of the product.

What is claimed is:

1. A lubricated and stabilized polyvinyl chloride composition comprising polyvinyl chloride and a stabilizer lubricant comprising the salt of an organic acid having the general formula $R_nSnR'_{4-n}$ wherein R is $C_1$–$C_8$ alkyl, R' is the acid group derived from a monohydroxy or dihydroxy substituted saturated aliphatic monocarboxylic acid of 12–24 carbon atoms and $n$ is 2 or 3, said tin salt being incorporated into the composition at about 0.5 to 5 parts by weight per 100 parts of polyvinyl chloride, said salt being incorporated into the composition by introducing the tin salt into a polyvinyl chloride polymerization reaction medium, said salt thereby being intimately mixed with the polyvinyl chloride so formed.

2. The polyvinyl chloride composition of claim 1 wherein the acid group is derived from an acid selected from the group consisting of 12-hydroxystearic acid, 9,10-dihydroxystearic acid and mixtures thereof.

3. The polyvinyl chloride composition of claim 1 wherein R is ethyl, propyl, butyl, pentyl, hexyl, octyl or mixtures thereof.

4. The polyvinyl chloride composition of claim 1 wherein R is butyl.

5. The polyvinyl chloride composition of claim 2 wherein R is butyl and $n$ is 2.

6. The polyvinyl chloride composition of claim 2 wherein R is butyl and $n$ is 3.

7. The polyvinyl chloride composition of claim 1 wherein the tin salt is incorporated at a concentration of about 1.5 to about 3.5 parts by weight per 100 parts of polyvinyl chloride.

References Cited
UNITED STATES PATENTS

| | | | |
|---|---|---|---|
| 2,560,034 | 7/1951 | Eberly | 260—45.75 |
| 2,794,791 | 6/1957 | Patton et al. | 260—23 |
| 2,938,013 | 5/1960 | Mack et al. | 260—45.75 |
| 3,466,310 | 9/1969 | Diamond | 260—413 |
| 3,468,828 | 9/1969 | Perrins et al. | 260—45.75 |
| 3,674,730 | 7/1972 | King | 260—23 |

OTHER REFERENCES

Modern Plastics, December 1949, pp. 111 to 116 and 156 to 162; article "Stabilization of Polyvinyl Chloride" by Lally et al.

DONALD E. CZAJA, Primary Examiner

V. P. HOKE, Assistant Examiner

U.S. Cl. X.R.

260—23 XA, 32.2